US012608557B2

(12) United States Patent
Wu et al.

(10) Patent No.: US 12,608,557 B2
(45) Date of Patent: Apr. 21, 2026

(54) CHINESE DIALOGUE SYSTEM FOR COGNITIVELY IMPAIRED ADULTS BASED ON COGNITIVE STIMULATION THERAPY PRINCIPLES

(71) Applicant: The University of Hong Kong, Hong Kong (HK)

(72) Inventors: Chuan Wu, Hong Kong (HK); Jiyue Jiang, Hong Kong (HK); Sheng Wang, Hong Kong (HK); Lingpeng Kong, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 198 days.

(21) Appl. No.: 18/747,499

(22) Filed: Jun. 19, 2024

(65) Prior Publication Data

US 2025/0005291 A1 Jan. 2, 2025

Related U.S. Application Data

(60) Provisional application No. 63/510,883, filed on Jun. 28, 2023.

(51) Int. Cl.
G06F 40/35 (2020.01)

(52) U.S. Cl.
CPC .................................. G06F 40/35 (2020.01)

(58) Field of Classification Search
CPC ......... G06F 40/35; G06F 40/284; G06F 40/30
See application file for complete search history.

(56) References Cited

U.S. PATENT DOCUMENTS 10,113,877 B1 * 10/2018 Schaefer ................. G06F 3/012
2006/0074670 A1 4/2006 Weng et al.
(Continued)

FOREIGN PATENT DOCUMENTS

CN 115688753 A 2/2023
CN 115858756 A 3/2023
(Continued)

OTHER PUBLICATIONS

Upadhyay, Kosha, Jason Zhang, and Eric Lloyd. "Cognitive Profiling and Personalized Therapy Recommendation for Dementia through a Language Aware Multi-Model Artificially Intelligent System." 2022 IEEE MIT Undergraduate Research Technology Conference (URTC). IEEE, 2022. (Year: 2022).*

(Continued)

*Primary Examiner* — Athar N Pasha
(74) *Attorney, Agent, or Firm* — IDEA Intellectual Limited; Sam T. Yip

(57) ABSTRACT

A dialogue system for cognitively impaired adults based on CST principles is provided. The dialogue system includes an encoder module, a decoder module, and an external knowledge module. The encoder module is configured to classify utterance and execute a progressive mask context training part and a text classification part. The progressive mask context training part performs a sentiment analysis function and a keyword extraction. The text classification part performs text classification tasks comprising emotion, strategy, and CST classifications. The decoder module is in electrical communication with the encoder module for response generation according to predicted values derived from attention weights in response to outcomes of the encoder module from the utterance. The external knowledge module, the encoder module, and the decoder module interact with each other to form a dialogue framework embedded with CST principles through multi-source knowledge fusion and to guide the dialogue framework to generate responses.

14 Claims, 4 Drawing Sheets

100

(56) References Cited

U.S. PATENT DOCUMENTS

| | | | | |
|---|---|---|---|---|
| 2020/0225963 A1* | 7/2020 | Noh | | G06F 3/011 |
| 2021/0294985 A1* | 9/2021 | Saito | | G06F 40/166 |
| 2021/0342554 A1* | 11/2021 | Martin | | G06F 16/355 |
| 2021/0374334 A1 | 12/2021 | Li et al. | | |
| 2023/0075339 A1* | 3/2023 | Lei | | G06F 40/56 |
| 2023/0146979 A1* | 5/2023 | Gunasekara | | G06F 40/205 704/9 |
| 2023/0334244 A1* | 10/2023 | Tensmeyer | | G06N 3/09 |
| 2024/0136049 A1 | 4/2024 | Rodriguez et al. | | |

FOREIGN PATENT DOCUMENTS

| | | |
|---|---|---|
| CN | 116403680 A | 7/2023 |
| CN | 117112739 A | 11/2023 |
| ES | 1075235 U | 8/2011 |
| FR | 3062307 A1 | 8/2018 |
| JP | 2022020942 A | 2/2022 |

OTHER PUBLICATIONS

Cognitive Profiling (Year: 2022).*
Population ages 65 and above (% of total population) [online], The World Bank Group, 2023, [retrieved on Aug. 12, 2024], Retrieved from the Internet: <URL: https://data.worldbank.org/indicator/SP.POP.65UP.TO.ZS>.
Dementia [online], World Health Organization, 2023, [retrieved on Aug. 12, 2024], Retrieved from the Internet: <URL: https://www.who.int/news-room/fact-sheets/detail/dementia>.
Seiki Tokunaga et al., "A Dialogue-Based System with Photo and Storytelling for Older Adults: Toward Daily Cognitive Training", Frontiers in Robotics and AI, 2021, vol. 8, No. 644964, p. 1-15.
John E. Morley MB et al., "Cognitive Stimulation Therapy", JAMDA, 2014, vol. 15, p. 689-691.
Ashish Vaswani et al., "Attention Is All You Need", arXiv, 2017, p. 1-15.
google-bert/bert-base-chinese [online], Hugging Face, 2018, [retrieved on Aug. 12, 2024], Retrieved from the Internet: <URL: https://huggingface.co/google-bert/bert-base-chinese>.
uer/gpt2-chinese-cluecorpussmall [online], Hugging Face, 2021, [retrieved on Aug. 12, 2024], Retrieved from the Internet: <URL: https://huggingface.co/uer/gpt2-chinese-cluecorpussmall>.
Ownthink/Jiagu [online], GitHub, 2019, [retrieved on Aug. 12, 2024], Retrieved from the Internet: <URL: https://github.com/ownthink/Jiagu>.
Lung-Hao Lee et al., "Chinese EmoBank: Building Valence-Arousal Resources for Dimensional Sentiment Analysis," ACM Transactions on Asian and Low-Resource Language Information Processing, 2022, vol. 21, No. 4, Article 65, p. 1-18.
Liang-Chih Yu et al., "Building Chinese Affective Resources in Valence-Arousal Dimensions", Proceedings of NAACL/HLT-16, 2016, p. 540-545.
Jiyue Jiang et al., "A Cognitive Stimulation Dialogue System with Multi-source KnowledgeCognitive Impairment", arXiv, 2023.

* cited by examiner

CHINESE DIALOGUE SYSTEM FOR COGNITIVELY IMPAIRED ADULTS BASED ON COGNITIVE STIMULATION THERAPY PRINCIPLES

TECHNICAL FIELD

The present invention generally relates to dialogue systems for cognitively impaired adults. More specifically, the present invention relates to Chinese dialogue systems for cognitively impaired adults based on cognitive stimulation therapy principles.

BACKGROUND

There are approximately seven hundred million older adults over sixty-five years old worldwide, and more than fifty million people are living with cognitive impairment, such as dementia. Each year, nearly ten million new patients are diagnosed with cognitive impairment. This condition not only causes significant difficulties in the daily lives of those affected but also severely reduces their quality of life. Furthermore, cognitive impairment places a substantial caregiving burden on family members, who often struggle to provide the necessary support and care.

Currently, most restorative cognitive therapy methods rely on traditional question-and-answer formats and storytelling techniques. These methods often lead to rigid and unengaging dialogue systems that fail to capture the interest of older adults. The lack of interactive and stimulating conversation in these systems makes it challenging to maintain the attention and engagement of elderly individuals, ultimately limiting the effectiveness of the therapy and the potential for cognitive improvement.

Cognitive Stimulation Therapy (CST) is a short course of evidence-based and nonpharmacologic therapy designed for patients with mild or moderate cognitive impairment. CST is structured around 18 guiding principles, which are depicted in FIG. 1. In this regard, CST has been shown to be effective in improving cognitive function.

Recently, there has been increasing interest in the use of interactive conversations between robots and patients. Robots equipped with conversational capabilities can automatically initiate dialogue with patients, providing a unique opportunity to engage individuals in a more dynamic and personalized manner. However, existing methods in this field often lack effectiveness and fail to offer truly personalized and interactive experiences. The current robotic systems struggle to adapt to the individual needs and preferences of patients, resulting in interactions that may feel generic and uninspiring.

Therefore, there is a need for an improved dialogue system that combines CST principles with advanced conversational capabilities to engage and stimulate older adults with cognitive impairment, particularly within Chinese-based engines.

SUMMARY OF INVENTION

It is an objective of the present invention to provide a system and a method to address the aforementioned shortcomings and unmet needs in the state of the art.

In accordance with a first aspect of the present invention, a dialogue system for cognitively impaired adults based on cognitive stimulation therapy (CST) principles is provided. The dialogue system includes an encoder module, a decoder module, and an external knowledge module. The encoder module is configured to classify utterance and execute a progressive mask context training part and a text classification part. The progressive mask context training part is configured to perform a sentiment analysis function for extracting entities and sentences whose values are greater than a threshold and to perform a keyword extraction function for extracting keywords in the utterances. The text classification part is configured to perform text classification tasks comprising emotion, strategy, and CST classifications. The decoder module is in electrical communication with the encoder module for response generation according to predicted values derived from attention weights in response to outcomes of the encoder module from the utterance. The external knowledge module is in electrical communication with the encoder module and the decoder module such that the external knowledge module, the encoder module, and the decoder module interact with each other, so as to form a dialogue framework embedded with CST principles through multi-source knowledge fusion and to guide the dialogue framework to generate responses in line with the CST principles.

In accordance with a second aspect of the present invention, a dialogue conversation system for cognitively impaired adults based on CST principles is provided. The dialogue conversation system includes a dialogue system, an input user interface, an input convertor, an output convertor, and an output user interface. The input user interface is for receiving user's text input. The input convertor is coupled between the input user interface and the dialogue system and is configured to convert user's input into a digital signal format that the dialogue system is able to recognize and process, which involves transforming written Chinese into numerical representations that are suitable for computational processing. The output convertor is coupled with the dialogue system and is configured to translate the digital signal output from the dialogue system back into Chinese content, ensuring that the response is in a human-readable format. The output user interface is coupled with the output convertor and is configured to deliver the Chinese content from the output convertor to user.

As existing cognitive recovery dialogue systems in the prior arts are usually in English and based on question-and-answer formats, the approach of the present disclosure provides a Chinese dialogue system based on CST principles. Compared with its English counterparts, the main advantage of this system is that it allows for flexible and emotionally supportive conversations with elders following CST principles. This system further includes: (1) multi-source knowledge fusion; (2) a Chinese dialogue system; and (3) specially designed features for flexible and emotionally supportive dialogue responses based on CST principles.

BRIEF DESCRIPTION OF DRAWINGS

Embodiments of the invention are described in more details hereinafter with reference to the drawings, in which.

DETAILED DESCRIPTION OF THE INVENTION

In the following description, Chinese dialogue systems and methods for cognitively impaired adults based on cognitive stimulation therapy principles and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 2:
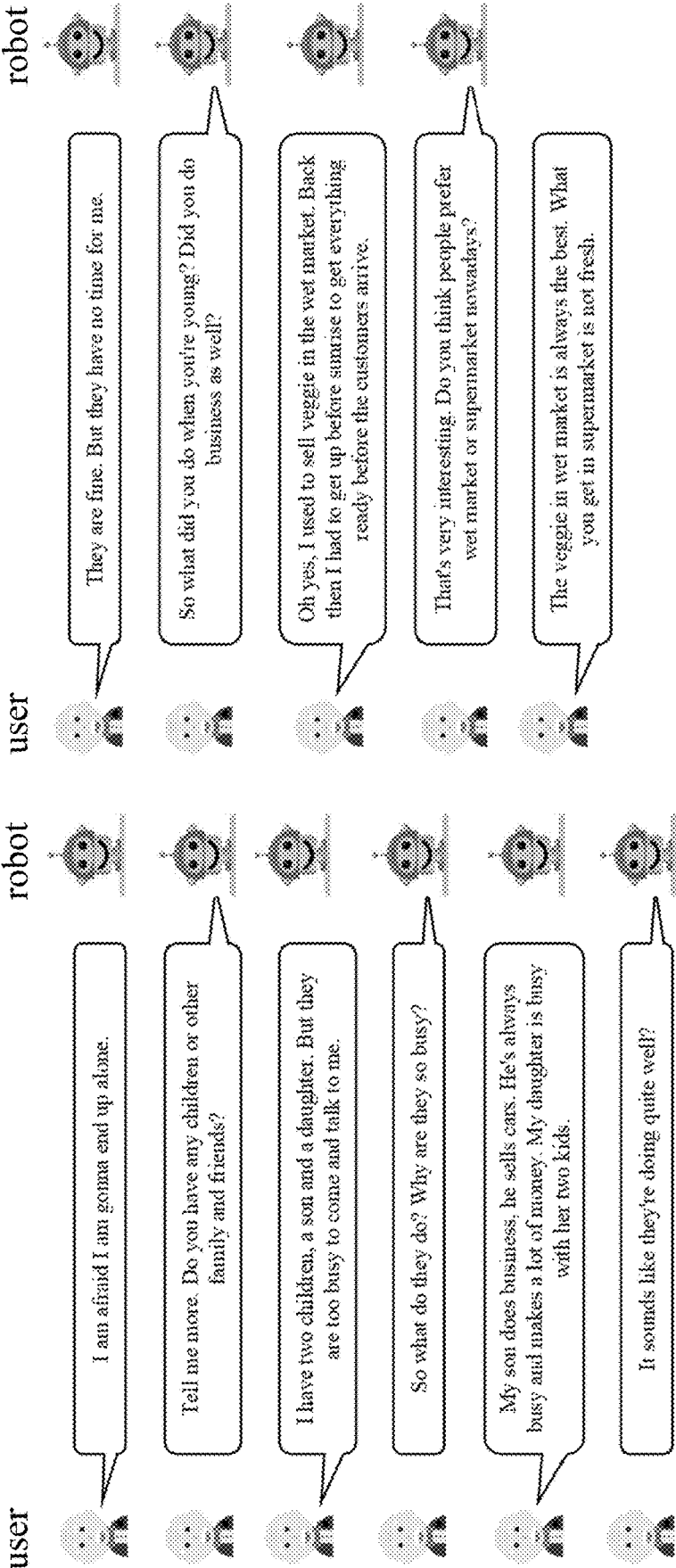
FIG. 2 illustrates the dialogue between the robot and an older user in a CST-based dialogue system according one embodiment of the present invention.

As mentioned earlier, CST principles can better stimulate the thinking and expression of older adults. FIG. 2 illustrates the dialogue between the robot and an older user in a CST-based dialogue system according one embodiment of the present invention. It demonstrates CST principles such as using reminiscence as an aid to the here-and-now and focusing on opinions rather than facts, which are difficult to achieve with general-purpose dialogue systems. Integrating a Chinese dialogue system with CST principles is the primary goal of this invention. Additionally, multi-source knowledge is fused into this system for more realistic dialogue content.

Furthermore, there are certain disadvantages in the related arts. For instance: (1) The encoders in the related arts classify individual utterances instead of considering the dialogue history; (2) In some cases, the responses generated by the dialogue systems in the related arts do not adequately address the user's query or input. The CST-based dialogue system of the invention is designed to address these disadvantages.

In the present disclosure, a Chinese dialogue system for elders based on CST principles is provided, which is used to improve or maintain the cognitive level of cognitively impaired older adults. In this dialogue system, the CST principles are embedded into the dialogue system through the fusion of multi-source knowledge, so as to guide the dialogue system to generate responses in line with CST principles. As the existing cognitive training dialogue systems usually conduct rigid dialogues of limited scope, such as storytelling, question-and-answer, etc, in the present disclosure, the provided approach is flexible and emotionally supportive conversations with elders comprehensively based on CST principles, for better improvement/maintenance of the user's cognitive functions.

Figure 3:
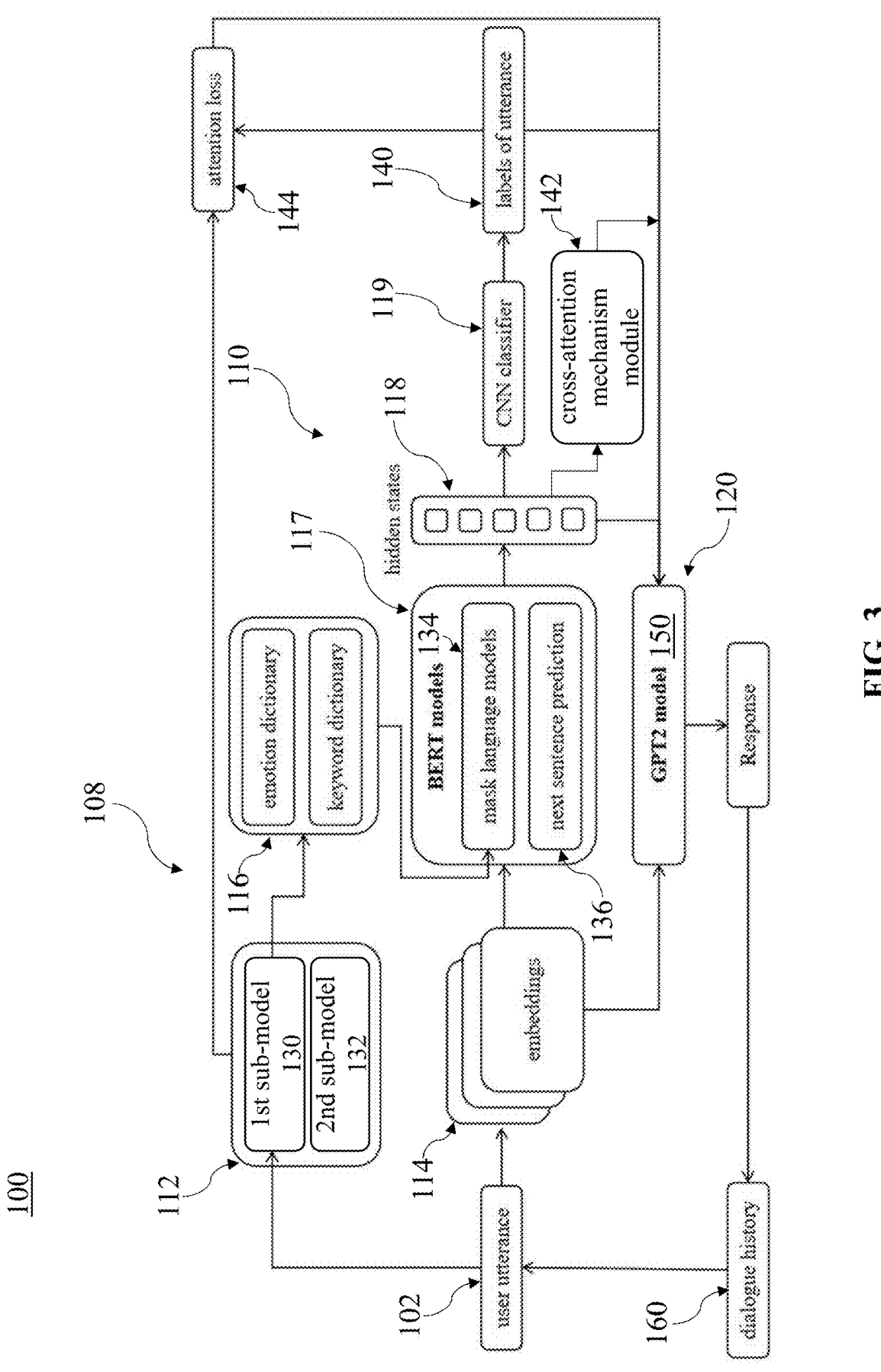
FIG. 3 depicts an overall framework of a dialogue system applying a dialogue model based on an encoder-decoder structure according to some embodiments of the present disclosure.

FIG. 3 depicts an overall framework of a dialogue system 100 applying a dialogue model based on an encoder-decoder structure according to some embodiments of the present disclosure. The encoder-decoder structure includes an external knowledge module 108, an encoder module 110, and a decoder module 120. The encoder module 110 is trained for classifying utterance and is divided into a progressive mask context training part and a text classification part. The decoder module 120 is in electrical communication with the encoder module 110 and is for response generation according to predicted values derived from attention weights. The external knowledge module 108 interacts with the encoder module and the decoder module. The external knowledge database 108, the encoder module 110, and the decoder module 120 are able to interact with each other, so as to form a dialogue framework. User utterance serve as an input source 102 for the dialogue system 100, referring to the text or speech input from the user.

The external knowledge module 108 includes an extractor 112 for the input source 102, a dictionary database 116 coupled with the extractor 112, and an attention loss module 144. The encoder module 110 includes, a Bidirectional Encoder Representations from Transformers (BERT) module 117 coupled with the embedding layer 114 and with the dictionary database 116, a hidden layer extractor 118 coupled with the BERT module 117, and a classifier 119 coupled with the hidden layer extractor 118. The encoder module 110 further includes an input layer 140, a classifier 119, and a cross-attention mechanism module 142

Regarding the progressive mask context training part, the external knowledge module 108 and the encoder module 110 can be configured to work for training collectively; during training, they are configured to randomly mask tokens for better generalizability.

Specifically, the extractor 112 includes a first sub-model 130 and a second sub-model 132. In one embodiment, the first sub-model 130 applies the Jiagu tool with a keyword extraction function. The sentiment analysis function is for extracting entities and sentences whose values are greater than a threshold from the user utterance of the input source 102 based on a Chinese Emobank module of the second sub-model 132. In one embodiment involving the Jiagu tool, the threshold is set as 0.8; for example, if a sentence has a sentiment analysis score of 0.85, this sentence would be classified as having strong sentiment because it exceeds the threshold of 0.8. The keyword extraction function of the Jiagu tool is configured to extract keywords in user utterances of the input source 102. In one embodiment, the second sub-model 132 applies a Chinese Emobank module to perform emotion classification tasks, which provides a dataset annotated with emotional categories to understand the emotional state of the user utterances from the input source 102.

Using the extractor 112, emotion and keyword dictionaries are constructed within the dictionary database 116. In one embodiment, the external knowledge module 108 serves as an external knowledge database providing external knowledge sources to enhance the system's understanding of Chinese conversations, offering users a better conversational experience rather than standard responses.

The dictionaries are then utilized by the mask language models 134 of the BERT module 117 during the context training process (i.e., feeding the dictionaries of the dictionary database 116 into the mask language models 134). Data is masked according to predefined thresholds set by the emotional and keyword dictionaries stored in the dictionary database 116. As training progresses, the scope of a single mask gradually expands, starting from masking single word and progressing to multiple words and then complete sentences. In one embodiment, the proportions of one-word entity, two-word entity, three-word entity, four-word entity and sentence are 0.5, 0.5, 0.4, 0.3 and 0.2, respectively. Additionally, to enhance the generalization capabilities of the encoder module 110 through progressive masking, a portion of the traditional BERT mask method provided by the BERT module 117 is retained. For example, in one embodiment, 5% of entities in discourse are randomly masked, with 80% being replaced, 10% being substituted randomly, and 10% remaining unchanged.

After the progressive mask operation, the encoder module 110 is configured to encode context information for the user utterances of the input source 102 (i.e., context learning), and then the pretrained models are obtained. The encoder module 110 can process utterance emotion classification via the emotion dictionary and can classify the CST principle and support strategy of the user utterances of the input source 102 based on the keyword dictionary.

Furthermore, the BERT module 117 further includes a next sentence prediction model 136 configured to predict whether one sentence logically follows another in a given pair, which aids in generating coherent responses.

The dialogue system 100 further includes an embedding layer 114. These input source 102 is also processed through the embedding layer 114, which connects it to the BERT module 117. The embedding layer 114 is configured to take the user utterance from the input source 102 and convert it into a format suitable for the BERT module 117. This involves transforming the text into embeddings, which are numerical representations of words or sentences that the BERT module 117 can understand. Accordingly, the BERT module 117 can process the embedded user utterance to understand its context and meaning. That is, the embedding layer 114 acts as an interface between the user utterance from the input source 102 and the BERT module 117, ensuring that the input is properly formatted and processed by the BERT module 117.

The BERT module 117 can generate hidden states for text classification. These hidden states are high-dimensional numerical representations of the context and meaning of the users utterances. In one embodiment, the BERT module 117, via the masked language model 134 and the next sentence prediction model 136, processes the input data to generate a series of hidden states. The hidden layer extractor 118 receives the hidden states and feeds them into the classifier 119 (e.g., a CNN classifier) for text classification. The classifier 119, by receiving and analyzing the hidden states, can perform tasks such as emotion classification, CST principle classification, and strategy classification.

Figure 1:
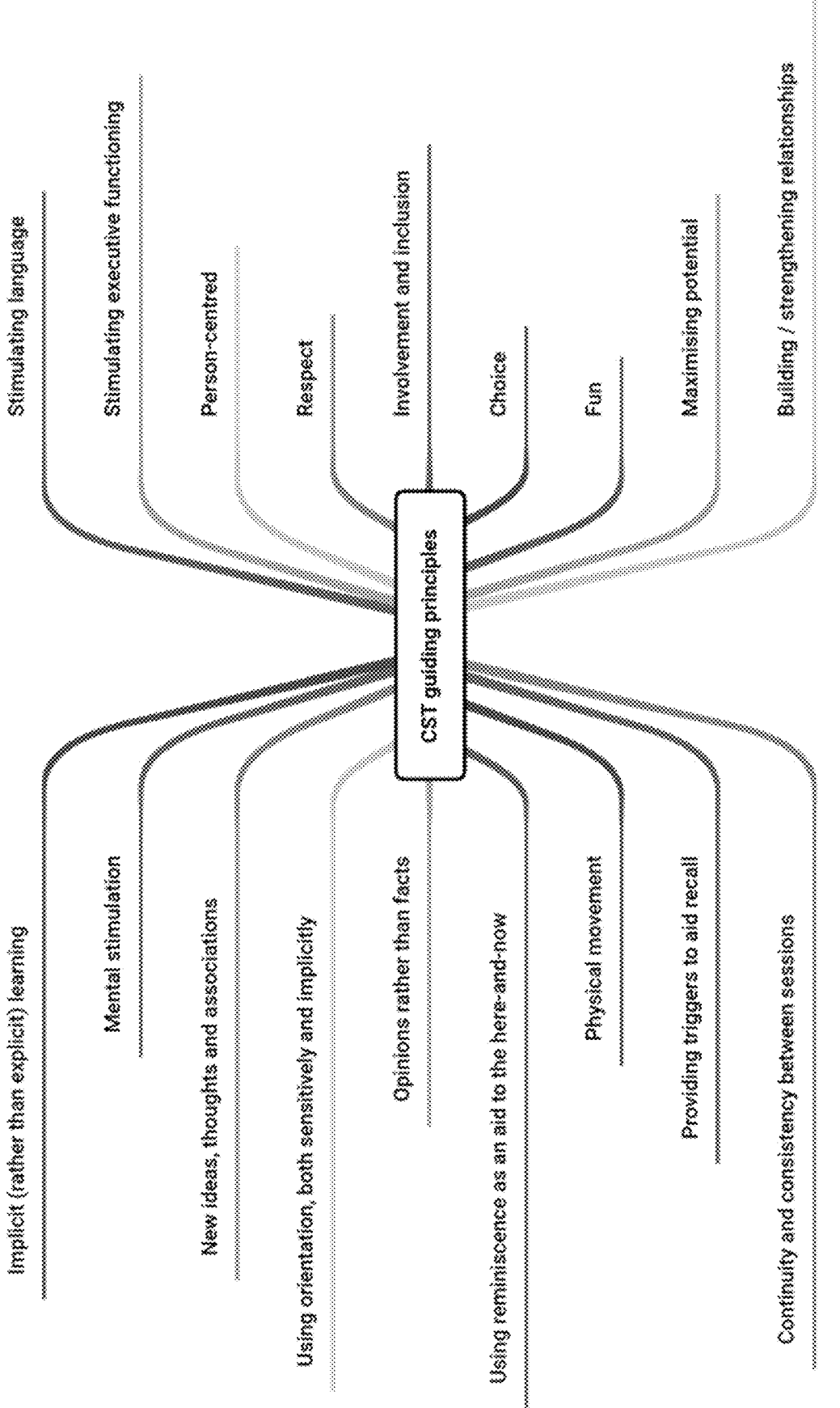
FIG. 1. depicts eighteen guiding principles of Cognitive Stimulation Therapy (CST)

In this regard, there are three types for text classification tasks, including emotion, strategy and CST classifications. Emotions are classified into seven categories: neutral, disgust, sadness, fear, surprise, happiness and anger. The strategy classes include neutral, question, restatement or paraphrasing, reflection of feeling, self-disclosure, affirmation and reassurance, providing suggestions, information and others. CST has eighteen classes, i.e., eighteen CST guiding principles as shown in FIG. 1.

The model based on emotion dictionary training is used for emotion classification. The models based on keyword dictionary training are used for strategy classification and CST classification. For example, during the progressive mask operation, data is processed through the emotion and keyword dictionaries of the dictionary database 116 to generate context-specific labels for training. These labels are used in the emotion dictionary training for the emotion classification and keyword dictionary training for the strategy and CST classification.

In one embodiment, during emotion dictionary training, the encoder module 110 utilizes the emotion dictionary to train models that classify the emotional content of user utterances. These models assign labels to the emotional states of utterances, enabling the classifier 119 to accurately recognize and categorize various emotions. In another embodiment, during keyword dictionary training, the encoder module 110 uses the keyword dictionary to train models that classify the strategy and CST principles within user utterances. These models generate labels for different CST principles and conversational strategies, enabling the classifier 119 to identify and apply the appropriate response strategies Explain it another way, the dictionary database 116 constructs and stores the emotion and keyword dictionaries; the encoder module 110 accesses these dictionaries during training to generate labels for the user utterances; and the emotion dictionary is used to label and classify the emotional content of utterances, while the keyword dictionary is used to label and classify CST principles and conversational strategies. These labeled data points are then processed by the hidden layer extractor 118 and fed into the classifier 119, which performs the final tasks of emotion, CST principle, and strategy classification.

In one embodiment, the models (e.g., the classifier 119) configured to perform classification tasks for CST principles are trained to recognize the groups/species of the eighteen CST guiding principles using labels as follows: (1) implicit (rather than explicit) learning; (2) mental stimulation; (3) new ideas, thoughts and associations; (4) using orientation, both sensitively & implicitly; (5) opinions rather than facts; (6) using reminiscence as an aid to here-and-now; (7) physical movement; (8) providing triggers to aid recall; (9) continuity and consistency between sessions; (10) stimulating language; (11) stimulating executive functioning; (12) person-centered; (13) respect; (14) involvement and inclusion; (15) choice; (16) fun; (17) maximizing potential; (18) building/strengthening relationships.

To train a model capable of recognizing the groups/species of those eighteen CST guiding principles, the process begins with data collection and labeling. This involves gathering a large dataset of dialogue examples that align with CST principles and annotating each example with the corresponding CST principle. Text embeddings are used to convert the dialogue text into numerical representations, capturing semantic information. In one embodiment, contextual features are extracted from the dialogue history to understand the flow and relationship of the conversation.

In one embodiment, the classifier is used to identify and categorize the input data into specific CST principles. The classifier 119 functions as a vector calculator, comparing the extracted hidden states from the hidden layer extractor 118, against the CST labels to determine the most appropriate classification. During training for the classifier 119, a loss function is defined to quantify the difference between the predicted and actual CST labels.

For each classification task, features of the utterances are extracted using the twelve-layer BERT model 117. The hidden state of the CLS token of each utterance, generated by the last layer of the hidden layer extractor 118, is then used for classification in the classifier 119. In one embodiment, all models in the classifier 119 are TextCNN, with convolution kernel sizes of (2, 3, 4) and a dimension of 256.

Thereafter, the classifier 119 outputs labels of utterance including labels for emotion, CST principles, and strategy classifications based on the processed user utterances. These labels categorize and classify the content and context of the utterances, enabling further analysis and decision-making processes downstream in the system.

Regarding multi-source interactive decoder, to generate responses more suitable for this scenario, the encoder module 110, external knowledge, and the decoder module 120 can interact via three aspects: (1) input layer; (2) cross-attention mechanism; and (3) attention loss.

As for input layer 140, the thirty-one labels of emotion, strategy, and CST classes are converted into new tokens in the vocabulary, such as emotion, strategy, and CST tokens.

In one embodiment, the emotion, strategy, and CST tokens of each sentence are concatenated with its original embedding. These concatenated embeddings participate in the subsequent training of the model; for example, the tokens are concatenated with the embedding layer 114.

As for the cross-attention mechanism provided by cross-attention mechanism module 142, an extra encoder is trained to flatten the input data (in the same format as the decoder input) and produce the corresponding hidden states. The hidden states as afore-mentioned are then extracted from the encoder module 110 to replace their counterparts generated by this extra encoder, forming new encoder hidden states embedded in the cross-attention mechanism for the decoder module 120. For instance, the decoder module 120 includes a GPT2 model 150 (e.g., a 12-layer GPT2 model), and these new encoder hidden states embedded in the cross-attention are used to feed the GPT2 model 150.

The GPT2 model 150 can generate cognitive stimulation dialogue, at least including ways: (1) the labels of the input layer 140 classified by the BERT model 117 (i.e., the BERT model 117 generates hidden states information, which is to be received by the CNN classifier 119 via the hidden layer extractor 118, and the CNN classifier 119 gives the labels to the input layer 140); (2) hidden state of the cross-attention mechanism module 142 is embedded in the decoder module 120 (i.e., the hidden state are from the BERT model 117, to the hidden layer extractor 118, the cross-attention mechanism module 142, and then the GPT2 model 150 in sequence); (3) attention loss is introduced into the generation for the cognitive stimulation dialogue (i.e., the emotion loss part is achieve by using the second sub-model 132, the dictionary database 116, the attention loss module 144, and the input layer 140; and the keyword loss part is achieve by using the first sub-model 130, the dictionary database 116, the attention loss module 144, and the input layer 140. More details are provided as follows.

As for attention loss provided by the attention loss module 144, emotional attention loss and keyword attention loss are enforced to focus on words with high emotional and keyword intensity values, which are obtained from Chinese Emobank and Jiagu of the extractor 112, respectively. In one embodiment, emotion loss and keywords loss are calculated using Mean Square Error (MSE). The predicted values are derived from the attention weights at the last layer of the decoder module 120, and the ground truth comes from Chinese Emobank and Jiagu of the extractor 112. In some embodiments, standard maximum likelihood estimator (MLE) is used as the optimization objective. Accordingly, emotion loss, keyword loss, and generation loss are summed with weights of 0.5, 0.5 and 1 by the attention loss module 144, respectively.

In the present disclosure, a Chinese CST dialogue dataset is applied to fine-tune the GPT-2 model 150. By using the method of multi-source knowledge fusion, two external knowledge sources (i.e., Jiagu and Chinese Emobank of the extractor 112) and the principles of CST are involved with the training of GPT-2 model 150, so as to generate flexible and emotionally supportive responses.

Specifically, in the illustration of FIG. 3, the GPT-2 model 150 generates responses based on inputs that include embeddings of embedding layer 114, hidden states of the hidden layer extractor 118, labels of utterance of the input layer 140, and attention loss of the attention loss module 144. These inputs allow the GPT-2 model 150 to produce contextually coherent and emotionally supportive responses. The GPT-2 model 150 outputs a response based on the inputs it receives. This response is then connected to a dialogue history module

160, which accumulates the context of the conversation. The dialogue history module 160 serves the purpose of providing context and continuity to the conversation flow, ensuring that the response generated by the GPT-2 model 150 considers the ongoing dialogue. Subsequently, the response and updated dialogue history are fed back into the encoder module 110 as part of the user utterance, forming a continuous loop that enhances the coherence and relevance of subsequent interactions.

As such, via the interaction among the encoder module 110, the decoder module 120, and the external knowledge database of the external knowledge module 108, a dialogue framework is formed, which is embedded with CST principles through multi-source knowledge fusion, and thus the dialogue framework is guided to generate responses in line with the CST principles.

By implementing the aforementioned configuration, computational speed can be increased to a certain extent; importantly, enhancing the fluency and efficiency of dialogue operations in Chinese content. The present invention optimizes the coherence of dialogue processes and contextual integration, allowing for more effective generation and guidance of conversations based on cognitive stimuli. These improvements not only make the dialogue process more natural but also enhance overall system performance and user experience.

Figure 4:
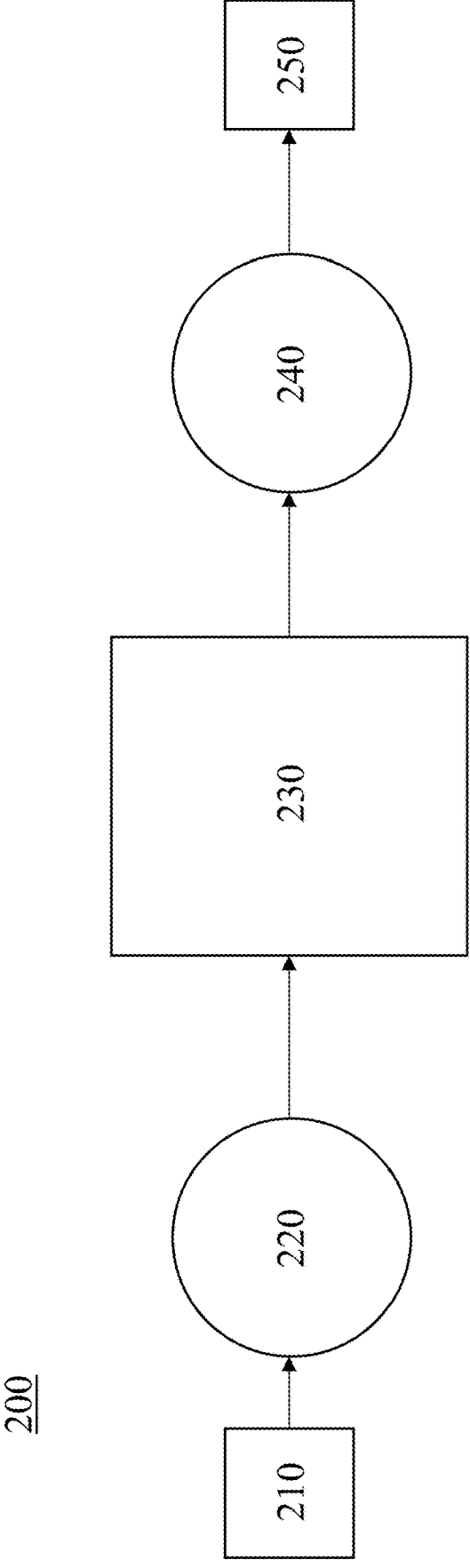
FIG. 4 depicts a schematic diagram of a dialogue conversation system using a dialogue system according to one embodiment of the present invention.

FIG. 4 depicts a schematic diagram of a dialogue conversation system 200 using a dialogue system according to one embodiment of the present invention. The dialogue conversation system 200 includes an input user interface 210, an input convertor 220, a dialogue system 230, an output convertor 240, and an output user interface 250. The dialogue system 230 is the comprehensive system as previously discussed, which includes modules/models for embedding, context encoding, classification, and response generation. The system is made for Chinese dialogues and leverages principles of CST and external knowledge sources such as Jiagu and Chinese Emobank to enhance its performance.

The input user interface 210 is responsible for receiving the user's text input, specifically in Chinese. The input convertor 220 is coupled between the input user interface 210 and the dialogue system 230 and is configured to convert the user's Chinese input into a digital signal format that the dialogue system 230 can recognize and process. It involves transforming written Chinese into numerical representations that are suitable for computational processing. The output convertor 240 is coupled with the dialogue system 230 and is configured to translate the digital signal output from the dialogue system 230 back into Chinese content, ensuring that the response is in a human-readable format. The output user interface 250 is coupled with the output convertor 240 and configured to deliver the Chinese content from the output convertor 240 to the user, completing the interaction cycle.

The functional units and modules of the apparatuses, systems, and/or methods in accordance with the embodiments disclosed herein may be implemented using computer processors or electronic circuitries including but not limited to application specific integrated circuits (ASIC), field programmable gate arrays (FPGA), microcontrollers, and other programmable logic teaching aids configured or programmed according to the teachings of the present disclosure. Computer instructions or software codes running in the computing teaching aids, computer processors, or programmable logic teaching aids can readily be prepared by practitioners skilled in the software or electronic art based on the teachings of the present disclosure.

The embodiments may include computer storage media, transient and non-transient memory teaching aids having computer instructions or software codes stored therein, which can be used to program or configure the computing teaching aids, computer processors, or electronic circuitries to perform any of the processes of the present invention. The storage media, transient and non-transient memory teaching aids can include, but are not limited to, floppy disks, optical discs, Blu-ray Disc, DVD, CD-ROMs, and magneto-optical disks, ROMs, RAMs, flash memory teaching aids, or any type of media or teaching aids suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing teaching aids interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A dialogue system for cognitively impaired adults based on cognitive stimulation therapy (CST) principles, comprising:

an encoder module configured to classify utterance and execute a progressive mask context training part and a text classification part, wherein the progressive mask context training part is configured to perform a sentiment analysis function for extracting entities and sentences whose values are greater than a threshold and to perform a keyword extraction function for extracting keywords in the utterances, and wherein the text classification part is configured to perform text classification tasks comprising emotion, strategy, and CST classifications;

a decoder module in electrical communication with the encoder module for response generation according to predicted values derived from attention weights in response to outcomes of the encoder module from the utterance; and an external knowledge module in electrical communication with the encoder module and the decoder module such that the external knowledge module, the encoder module, and the decoder module interact with each other, so as to form a dialogue framework embedded with CST principles through multi-source knowledge fusion and to guide the dialogue framework to generate responses in line with the CST principles;

wherein the external knowledge module comprises:

an extractor comprising a first sub-model with a sentiment analysis function and a keyword extraction function and a second sub-model configured to perform emotion classification tasks; and a dictionary database comprising an emotion dictionary and a keyword dictionary constructed using the first sub-model and the second sub-model of the extractor, wherein the extractor and the dictionary database are further configured to collectively serve as an external knowledge database for the external knowledge module so as to provide external knowledge sources for the encoder module and the decoder module;

wherein the encoder module comprises:

a bidirectional encoder representations from transformers (BERT) module coupled with the dictionary database and configured to mask data from dictionaries of the dictionary database according to predefined thresholds set by the emotion and keyword dictionaries stored in the dictionary database, so as to output hidden states for text classification; and wherein the decoder module comprises:

a GPT-2 model configured to generate flexible and emotionally supportive responses, wherein the GPT-2 model is trained by the multi-source knowledge fusion which involved with the external knowledge sources provided by the external knowledge database and the CST principles; and a Chinese CST dialogue dataset applied to fine-tune the GPT-2 model.

2. The dialogue system of claim 1, wherein the first sub-model applies a Jiagu tool for extracting entities and sentences whose values are greater than a threshold from the utterance, and wherein a second sub-model applies a Chinese Emobank model providing a dataset annotated with emotional categories to understand an emotional state of the utterance.

3. The dialogue system of claim 1, wherein the encoder module further comprises:

a hidden layer extractor and a classifier, wherein the hidden layer is configured to receive the hidden states from the BERT module and feed them into the classifier for text classification, and wherein the classifier receives and analyzes the hidden states for performing emotion classification, CST principle classification, and strategy classification.

4. The dialogue system of claim 3, wherein the classifier contains CST labels that are used to identify and categorize the input data into specific CST principles, and wherein the classifier is configured to function as a vector calculator for comparing the extracted hidden states from the hidden layer extractor, against the CST labels to determine the most appropriate classification.

5. The dialogue system of claim 4, wherein groups or species of the CST labels include: a label for implicit learning label; a label for mental stimulation; a label for new ideas, thoughts and associations; a label for using orientation; a label for both sensitively and implicitly; a label for opinions rather than facts; a label for using reminiscence as an aid to here-and-now; a label for physical movement; a label for providing triggers to aid recall; a label for continuity and consistency between sessions; a label for stimulating language; a label for stimulating executive functioning; a label for person-centered; a label for respect; a label for involvement and inclusion; a label for choice; a label for fun; a label for maximizing potential; and a label for building or strengthening relationships.

6. The dialogue system of claim 1, further comprising:

an input layer coupled with the classifier, wherein a plurality of labels of the emotion, strategy and CST classifications are converted into new tokens in vocabulary for the input layer.

7. A dialogue system of claim 6, further comprising:

an attention loss module, wherein emotional attention loss and keyword attention loss are enforced to focus on words with high emotional and keyword intensity values for the attention loss module.

8. A dialogue conversation system for cognitively impaired adults based on cognitive stimulation therapy (CST) principles, comprising:

a dialogue system of claim 1;

an input user interface for receiving user's text input;

an input convertor coupled between the input user interface and the dialogue system and configured to convert user's input into a digital signal format that the dialogue system is able to recognize and process, which involves transforming written Chinese into numerical representations that are suitable for computational processing;

an output convertor coupled with the dialogue system and configured to translate the digital signal output from the dialogue system back into Chinese content, ensuring that the response is in a human-readable format; and an output user interface coupled with the output convertor and configured to deliver the Chinese content from the output convertor to user;

wherein the external knowledge module comprises:

an extractor comprising a first sub-model with a sentiment analysis function and a keyword extraction function and a second sub-model configured to perform emotion classification tasks; and a dictionary database comprising an emotion dictionary and a keyword dictionary constructed using the first sub-model and the second sub-model of the extractor, wherein the extractor and the dictionary database are further configured to collectively serve as an external knowledge database for the external knowledge module so as to provide external knowledge sources for the encoder module and the decoder module;

wherein the encoder module comprises:

a bidirectional encoder representations from transformers (BERT) module coupled with the dictionary database and configured to mask data from dictionaries of the dictionary database according to predefined thresholds set by the emotion and keyword dictionaries stored in the dictionary database, so as to output hidden states for text classification; and wherein the decoder module comprises:

a GPT-2 model configured to generate flexible and emotionally supportive responses, wherein the GPT-2 model is trained by the multi-source knowledge fusion which involved with the external knowledge sources provided by the external knowledge database and the CST principles; and a Chinese CST dialogue dataset applied to fine-tune the GPT-2 model.

9. The dialogue conversation system of claim 8, wherein the first sub-model applies a Jiagu tool for extracting entities and sentences whose values are greater than a threshold from the utterance, and wherein a second sub-model applies a Chinese Emobank model providing a dataset annotated with emotional categories to understand an emotional state of the utterance.

10. The dialogue conversation system of claim 8, wherein the encoder module further comprises:

a hidden layer extractor and a classifier, wherein the hidden layer is configured to receive the hidden states from the BERT module and feed them into the classifier for text classification, and wherein the classifier receives and analyzes the hidden states for performing emotion classification, CST principle classification, and strategy classification.

11. The dialogue conversation system of claim 10, wherein the classifier contains CST labels that are used to identify and categorize the input data into specific CST principles, and wherein the classifier is configured to function as a vector calculator for comparing the extracted hidden states from the hidden layer extractor, against the CST labels to determine the most appropriate classification.

12. The dialogue conversation system of claim 11, wherein groups or species of the CST labels include: a label for implicit learning label; a label for mental stimulation; a label for new ideas, thoughts and associations; a label for using orientation; a label for both sensitively and implicitly; a label for opinions rather than facts; a label for using reminiscence as an aid to here-and-now; a label for physical movement; a label for providing triggers to aid recall; a label for continuity and consistency between sessions; a label for stimulating language; a label for stimulating executive functioning; a label for person-centered; a label for respect; a label for involvement and inclusion; a label for choice; a label for fun; a label for maximizing potential; and a label for building or strengthening relationships.

13. The dialogue conversation system of claim 8, wherein the dialogue system further comprises:

an input layer coupled with the classifier, wherein a plurality of labels of the emotion, strategy and CST classifications are converted into new tokens in vocabulary for the input layer.

14. A dialogue conversation system of claim 13, wherein the dialogue system further comprises:

an attention loss module, wherein emotional attention loss and keyword attention loss are enforced to focus on words with high emotional and keyword intensity values for the attention loss module.

\* \* \* \* \*